United States Patent [19]
Chen et al.

[11] Patent Number: 5,685,796
[45] Date of Patent: Nov. 11, 1997

[54] PLANETARY GEARING UNIT

[75] Inventors: Lei-Yi Chen, Hsinchu; Huie-Jan Shih, Taipei, both of Taiwan

[73] Assignee: Industrial Technology Research Institute, Hsinchu, Taiwan

[21] Appl. No.: 604,132

[22] Filed: Feb. 20, 1996

[51] Int. Cl.$^6$ ........................................ F16H 3/44
[52] U.S. Cl. ........................................ 475/320; 475/317
[58] Field of Search ........................ 475/159, 320, 475/317, 298

[56] References Cited

U.S. PATENT DOCUMENTS

| | | | |
|---|---|---|---|
| 2,971,406 | 2/1961 | Senkowski et al. | 475/320 X |
| 4,063,470 | 12/1977 | Kelbel | 475/320 |
| 4,074,591 | 2/1978 | Dick | 475/317 X |
| 4,569,252 | 2/1986 | Harper | 475/320 X |
| 4,791,833 | 12/1988 | Sakai et al. | 475/320 X |
| 4,920,828 | 5/1990 | Kameda et al. | 475/320 X |
| 5,209,708 | 5/1993 | Igaku | 475/320 X |

*Primary Examiner*—Charles A. Marmor
*Assistant Examiner*—Peter T. Kwon
*Attorney, Agent, or Firm*—W. Wayne Liauh

[57] ABSTRACT

This invention discloses an improved planetary gearing-unit. The device includes: an input shaft; a sun gear, tightly linked to the input shaft, rotatable as driven by the input shaft; several planet gears, engaged with the sun gear; a fixed ring gear, encircling the circumference of the planet gears and engaged with the various planet gears; a planet gear carrier, being rotatable driven by the planet gears' revolving motion; an output shaft; a gearshift device, allowing the output shaft to be connected either to the input shaft or to the planet gear carrier, optionally, and to correspondingly rotate either along with the input shaft or with the planet gear carrier, so as to allow for switching into high or low gear. In this device assembly, both in high and in low gear the ring gear is fixed in the planetary gearing box without motion, thus not developing the stirring of oil and overcoming the problem of temperature rise and mechanical deformation, furthermore reducing the waste of energy.

6 Claims, 3 Drawing Sheets

PLANETARY GEARING UNIT

TECHNICAL FIELD

This invention relates to planetary gearing-units, especially with respect to those for use in medium and heavy cutting machine tool gearboxes.

BACKGROUND ART

Medium and heavy cutting machine tool gearboxes often have an arrangement of suitable gearboxes, in order to extend the range of their full power. Planetary gearboxes gradually have gained importance because they are small and made by molding. Today's common planetary gearboxes use two gears with respective gear ratios 1/1 and 1/4. Switching between high and low gear is accomplished by a gearshift system. As FIG. 1 shows for a conventional planetary gearbox in low gear, the main driving shaft 1 is linked to the sun gear 2, the ring gear 3 is via the gearshift locker 4 engaged with the mounting 5 and stays fixed, so as to let the planet gear carrier 6 drive the output shaft 8. As FIG. 2 shows for its high gear, the main driving shaft 1 and the sun gear 2 are via the gearshift locker 4 engaged with the ring gear 3, forming an integrated whole, while by the planet gear carrier 6 driving the output shaft 8. At that time, the main driving shaft 1, the sun gear 2, the ring gear 3, the planet gears 7 and the planet gear carrier 6 rotate together.

The biggest problem with this kind of gearbox is that in high gear a temperature rise is brought about, causing deformation. In planetary gearboxes, the most common lubricating method is filling the gearbox case with oil, without circulation or cooling. With rotation in high gear, the ring gear rotates along as well, leading to a violent stirring of oil, thus causing a temperature rise. The highest temperature may reach between 80° C. and 90°C., bringing about many problems at usage.

This problem of a temperature rise mainly arises from the design of the gearshift system. Only if an appropriate gearshift system is employed, allowing the massive ring gear 3 maintain its fixed position in high as well as in low gear, then the problem of temperature rise will not occur. This invention presents a novel kind of the gearshift system design of a planetary gearbox, replacing the conventional method and solving the problem of a temperature rise.

DISCLOSURE OF THE INVENTION

The main idea of this invention's planetary gearing-unit is to let the ring gear, which is most related to the stirring of oil, stay fixed, both in high and low gears. To accomplish this aim, the following basic technical method is employed: a switching device lets the gearing unit's output shaft engage optionally either with the gearing unit's planet gear carrier or directly with the input shaft, used for driving the sun gear.

When the output shaft is engaged with the planet gear carrier, the input shaft's moment is, after a reduction of velocity by the planet gears, further transmitted to the output shaft. Thereby transmission at low gear is attained. At high gear the output shaft is by means of the switching device engaged with the input shaft, such that the input shaft's rotational velocity is transmitted to the output shaft in a 1-to-1 ratio.

In the planetary gearing unit of this invention the above technical method leaves the ring gear fixed without movement, both in high and in low gear. Therefore there will be no severe effect of oil stirring, and the problem of a temperature rise can effectively be solved.

The technical methods employed in order to attain the foregoing objectives as well an other advantages will become apparent from the following description of the professed embodiment taken in conjunction with the accompanying drawings.

BEST MODE FOR CARRYING OUT THE INVENTION

Figure 1:
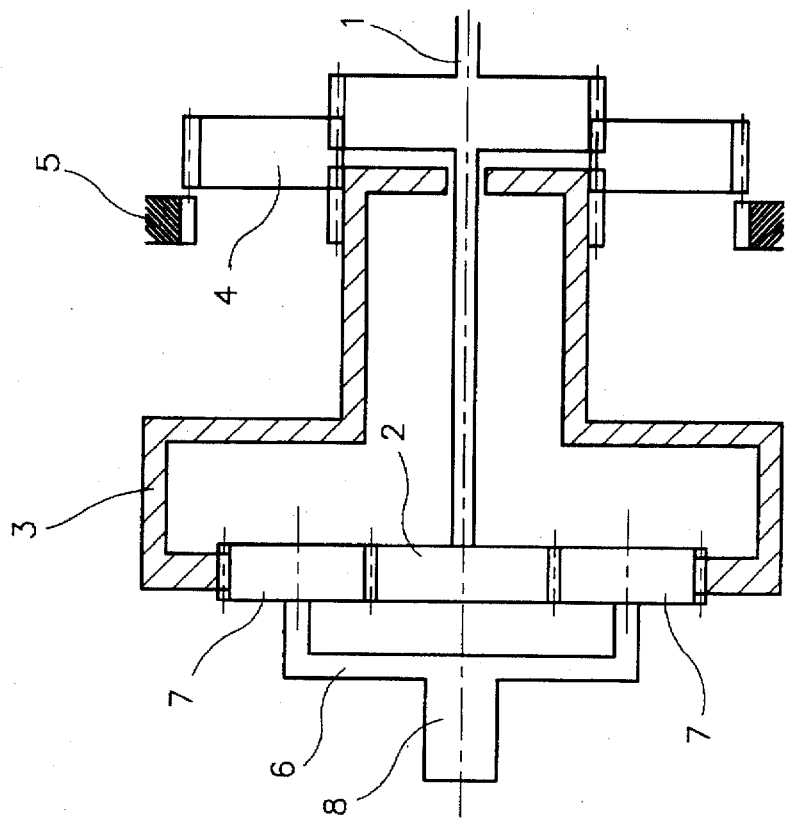
FIG. 1 shows a conventional planetary gearbox in low gear state.
Figure 2:
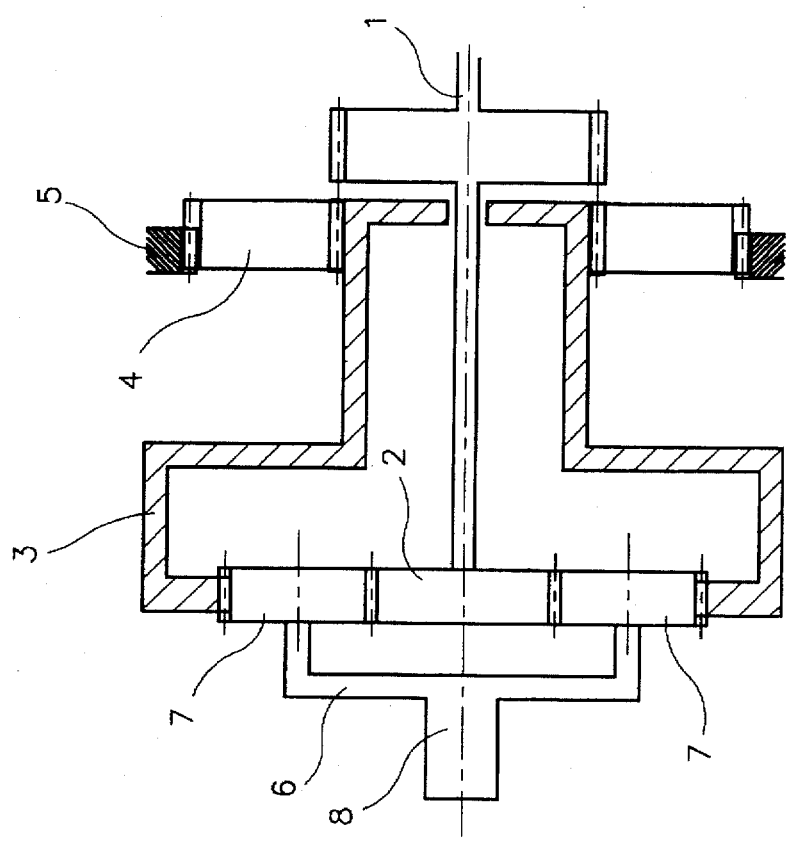
FIG. 2 shows a conventional planetary gearbox in high gear state.
Figure 3:
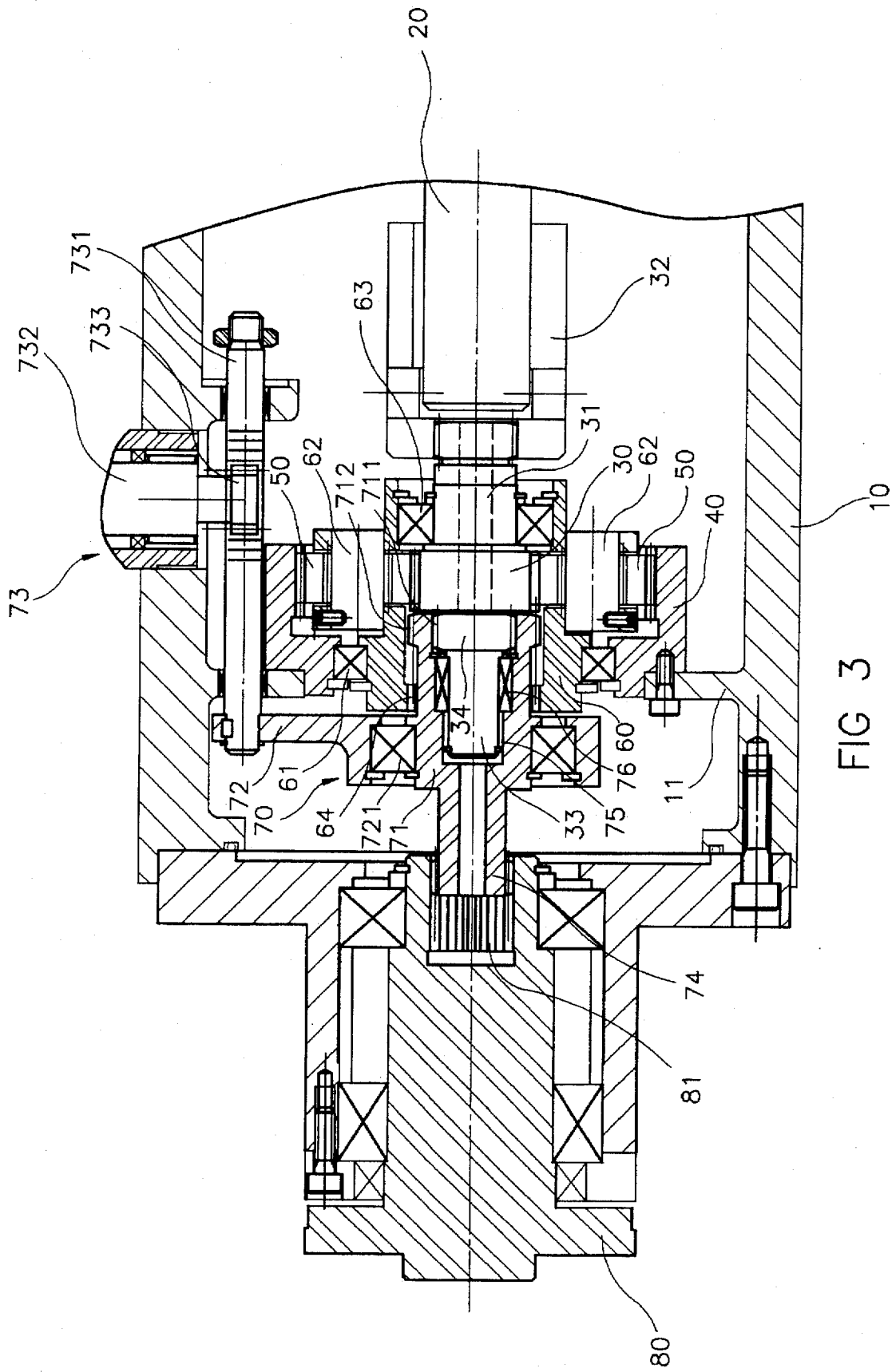
FIG. 3 is a sectional view of the planetary gearing-unit of the present invention, using the high gear state as an embodiment.

FIG. 3 shows an embodiment of the planetary gearing-unit of the present invention. It mainly includes: a gear case 10; a torque input shaft 20, extending through one side of the gear case into its interior and rotationally driven by the machine tool; a sun gear 30, having a link shaft 31 on one side, the link shaft 31 being by a shaft coupling 32 linked to the input shaft 20, such that the sun gear 30 is rotationally driven by the input shaft 20; one on the whole circular shaped ring gear 40, being tightly fastened to a projection 11 of the gear case 10 and sharing a common axis of the bore with the sun gear 30 and surrounding the sun gear 30.

Furthermore, several planet gears 50 are included. 15 They are located between the sun gear 30 and the ring gear 40 and engaged with the sun gear 30 and the ring gear 40 at the same time. The planet gears 50 can circle around the sun gear 30, constituting a planet-like revolving movement.

Moreover there is a planet gear carrier 60, which is rotatably installed inside the ring gear 40 by means of the shaft bearing 61. On the planet gear carrier 60 there are several planet gear axles 62 for holding the planet gears 50. The planet gear carrier 60 leaves some open space in its center and surrounds the sun gear 30 without mechanical contact. On its side near the input shaft 20 a shaft bearing 63 is mounted to support the link shaft 31 of the sun gear 30.

To the side of the sun gear 30 which is opposed to the link shaft 31 an extension shaft 33 is attached. On the extension shaft 33 a first coupling element 34 is mounted. Furthermore, on the side of the extension shaft 33 the planet gear carrier 60 has a second coupling element 64 on one edge of its inner surface.

In this invention the extension shaft 33 and the link shaft 31 of the sun gear 30 form one piece letting the first coupling element 34 be linked directly to the input shaft.

To switch gears in the gearing-unit of the present invention, a switching device 70 is used. It connects the output shaft 80, which shares a common axis of the bore with the input shaft 20, optionally to the planet gear carrier 60 or to the extension shaft 33. Thereby a transmission of motion at different velocities is achieved.

The switching device 70 includes: a link element 71, which shares a common axis of the bore with the input shaft 20 and is movable straightforwardly back and forth along the input shaft's axis; a driving holder 72 for pushing the link element 71 in its straight movement back and forth; a driving device 73 for pushing the driving holder 72.

The link element 71 has a spline shaft 74 close to its end on the side of the output shaft. The output shaft 80 is provided with a grooved key-bed 81, which the spline shaft 74 can engage with. Therefore the output shaft 80 can rotate driven by the link element 71. At the same time a relative gliding motion along the axis is possible. The other end of the link element 71 leaves an opening 75, which can surround the extension shaft 33 of the sun gear 30. On the inner side of the opening 75 a bearing 76 is attached. The bearing 76 glides around the extension shaft, such that the link element 71 can utilize the extension shaft 33 as a gliding bed.

Inside the opening 75 a first coupling part 711 is attached. As FIG. 3 shows, when the link element 71 is pushed close to the sun gear 30, then the first coupling part 711 is engaged with the first coupling element 34, thus connecting the output shaft 80 with the sun gear 30 and the input shaft 20. Thereby the output shaft 80 is driven directly by the input shaft, and the gearing-unit is in high gear state.

Figure 4:
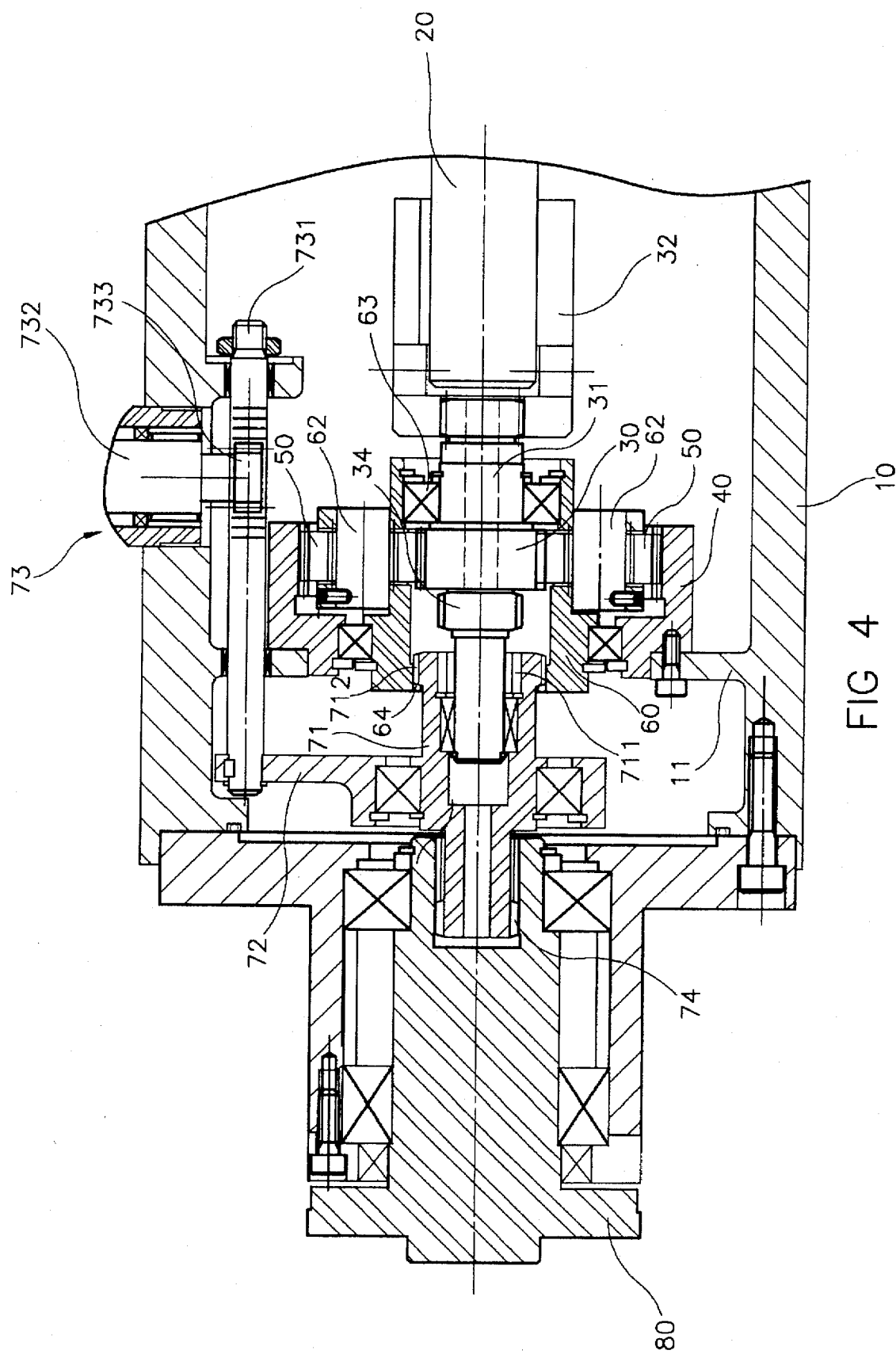
FIG. 4 is a sectional view of the planetary gearing-unit of the present invention in the low gear state.

On the periphery of the end of the link element 71 close to the sun gear 30 a second coupling part 712 is attached. As FIG. 4 shows, when the link element 71 is pushed towards the output shaft 80, then the second coupling part 712 is engaged with the second coupling element 64 on the planet gear carrier 60. At that time the output shaft 80, the link element 71 and the planet gear carrier 60 are connected. Thus the output shaft 80 rotates driven by the planet gear carrier 60. Since the system of the planet gears is provided with a rather high gear ratio, the rotation velocity of the output shaft 80 at that state is much less than that of the input shaft, and the gearing-unit is in low gear state.

In the embodiment of this invention the first and second coupling elements 34 and 64, respectively, fit to the first and second coupling part 711 and 712, respectively, as splined fittings.

Therefore, when the link element 71 is moved back and forth, the first or second coupling part 71i and 712 can smoothly be linked to or be separated from the first or second coupling element 34 and 64. The driving holder 72 encloses the periphery of the link element 71 and can push the link element 71 straightly back and forth, bringing about the movement for switching gears. The shaft bearing 721 between the driving holder 72 and the link element 71 reduces friction while the link element 71 rotates. The driving device 73 for pushing the driving holder 72 comprises: a rack 731, which is movable straightly back and forth parallel to the link element 71; a driving shaft 732 for driving the rack 731; and a pinion 733. The rack 731 is mounted inside the gear case 10, allowing for straight, gliding motion. Its one end is tightly linked to the driving holder 72, therefore it can drive the driving holder's back-and-forth motion. But it has to be clarified that a different device can be substituted fort he driving device 73, e.g. a pressurized oil vessel driving device replacing the rack and pinion transmission.

Comparing the design of this invention with conventional planetary gearboxes, its most distinguishing feature is that by means of the switching device 70 the output shaft 80 optionally is connected either with the planet gear carrier 60 or the input shaft 20 in order to switch to high and low gear. Unlike in conventional planetary gearboxes the ring gear stays fixed. In high gear it improves on the switching method of linking the ring gear to the input shaft and letting it rotate along with the input shaft. In the planetary gearing-unit of the present invention the ring gear stays fixed without motion both in high and in low gear. Therefore the effect of oil stirring can be reduced, and the problem of temperature rise and heat deformation in conventional planetary gearboxes can be solved.

What is claimed is:

1. A planetary gearing unit comprising:
   an input shaft;
   a sun gear, tightly linked to said input shaft, being able to rotatably driven by said input shaft;
   a plurality of planet gears surrounding the periphery of said sun gear, said planet gears being engaged with said sun gear;
   a ring gear, encircling the circumference of said planet gears and engaged with said plurality of planet gears;
   a planet gear carrier for holding said planet gears, said planet gear carrier being rotatably driven by a revolving motion of said planet gears;
   an output shaft, being positioned on the side of said planet gear carrier opposite of said input shaft;
   a gearshift device, allowing said output shaft to be connected optionally either to said input shaft of to said planet gear carrier and correspondingly allowing said output shaft to rotate either along with said input shaft of with said planet gear carrier to thereby switch into high or low rear;
   wherein said gearshift device further comprises:
   a link element, being mount between said output shaft and said sun gear, which is connected with said input shaft, said link element containing a spline on one end thereof close said output shaft to link to said output shaft, said link element furthermore being axially movable back and forth along an axis;
   a driving system for driving said link element back and forth along the axis
   a first coupling element, being mounted on said sun gear or said input shaft;
   a second coupling element, being mounted on said planet gear carrier;
   a first and second coupling part, being mounted on said link element such that, when said link element is close to said sun gear with said input shaft, then said first coupling part is engaged with said first coupling element, causing said output shaft to be driven directly by said input shaft, and when said link element is close to said output shaft, then said second coupling part is engaged with said second coupling element, causing said output shaft to be driven by said planet gear carrier.

2. A planetary gearing-unit as claimed in claim 1, wherein said first coupling element and second part as well as said second coupling element and second coupling part utilize spline fittings to be engaged together.

3. A planetary gearing-unit as claimed in claim 1, wherein said driving system further includes:
   a driving holder, being connected with said link element by a shaft bearing and being able to drive said link element axially back and forth, said link element and said driving holder being allowed to rotate against each other;
   a system for driving said driving holder straight back and forth.

4. A planetary gearing-unit as claimed in claim 3, wherein said system for driving said driving holder straight back and forth further includes:
   a tooth rack;
   a pinion for driving said tooth rack straight back and forth;
   a shaft for providing for the rotation of said pinion.

5. A planetary gearing-unit as claimed in claim 1, wherein a pressurized oil vessel can be substituted for the driving system.

6. A planetary gearing-unit as claimed in claim 1, wherein said link element can utilize an extension shaft of said sun gear as a gliding bed.

* * * * *